United States Patent [19]
Chudy

[11] Patent Number: 5,481,858
[45] Date of Patent: Jan. 9, 1996

[54] APPARATUS FOR LAWN MOWING AND SHREDDING

[76] Inventor: Matthew Chudy, 5724 Manton Ave., Woodland Hills, Calif. 91367

[21] Appl. No.: 192,704

[22] Filed: Feb. 7, 1994

[51] Int. Cl.$^6$ ..................................... A01D 34/68
[52] U.S. Cl. ..................... 56/17.5; 56/320.1; 56/DIG. 20
[58] Field of Search ........................... 56/17.5, 255, 295, 56/320.1, 320.2, DIG. 17, DIG. 20

[56] References Cited

U.S. PATENT DOCUMENTS

| Re. 29,139 | 2/1977 | Messner | 56/13.1 |
|---|---|---|---|
| 3,002,331 | 10/1961 | Denney | 56/25.4 |
| 3,049,854 | 4/1962 | Denney | 56/25.4 |
| 3,085,386 | 4/1963 | Slemmons | 56/25.4 |
| 3,531,923 | 10/1970 | DeLay | 56/25.4 |
| 3,797,212 | 3/1974 | Pursel | 56/255 |
| 3,959,954 | 6/1976 | Halsten | 56/12.8 |
| 4,083,166 | 4/1978 | Haas | 56/13.7 |
| 4,189,903 | 2/1980 | Jackson et al. | 56/255 |
| 4,196,568 | 4/1980 | Perry | 56/13.8 |
| 4,205,510 | 6/1980 | Raniero | 56/12.9 |
| 4,292,791 | 10/1981 | Lalonde | 56/255 |
| 4,318,268 | 3/1982 | Szymanis | 56/255 |
| 4,967,546 | 11/1990 | Forbush | 56/255 |
| 5,231,827 | 8/1993 | Connolly et al. | 56/320.2 X |

Primary Examiner—Terry Lee Melius
Attorney, Agent, or Firm—Patent Law & Venture Group; Gene Scott

[57] ABSTRACT

An apparatus for mowing and shredding a lawn is disclosed. A motor is mounted on a top cover. A push handle is engaged with the top cover and extends upwardly at an angle for pushing the apparatus in a forward rolling motion on the ground. The top cover is attached to and above a perforated partition that is supported by an undercarriage that includes a plurality of wheels. The motor has a downwardly extending drive shaft that extends through the top cover to engage a shredder blade. The drive shaft further extends downwardly through a central exhaust hole of the partition to a mower blade. The blades, when rotating, cause an upward air flow that sucks lawn debris into first the mower blade, through openings in the perforated partition, and into the shredder blade. The subsequent pulverized lawn debris is then ejected through discharge slots located around the peripheral edge of the top cover.

8 Claims, 5 Drawing Sheets

APPARATUS FOR LAWN MOWING AND SHREDDING

FIELD OF THE INVENTION

This invention relates generally to lawn mowing and shredding apparatus, and, more particularly, is directed towards such a device that provides improved shearing and cutting of lawn debris into a fine mulch.

BACKGROUND OF THE INVENTION

A fairly wide variety of pulverizing mowers exists in the prior art. See, for example, U.S. Pat. No. 4,318,268 to Szymanis on Mar. 9, 1982; U.S. Pat. No. 3,959,954 to Halsten on Jun. 1, 1976; U.S. Pat. No. 4,196,568 to Perry on Apr. 8, 1980; U.S. Pat. No. 3,531,923 to De Lay on Oct. 6, 1970; U.S. Pat. No. 4,189,903 to Jackson et al. on Feb. 26, 1980; and U.S. Pat. No. Re. 29,139 to Messner on Feb. 22, 1977.

Such pulverizing or mulching mowers differ from other cutting mowers in that the garden cuttings are pulverized into a fine mulch and redeposited on the ground, as opposed to being collected in a container for subsequent disposal. Two important measurements of the effectiveness and desirability of such mowers are first, how uniformly the resulting mulch is distributed on the ground, and second, how finely the cuttings are ground. These two factors both have an effect on how visibly noticeable the resulting mulch is after the lawn has been mowed.

Many of these devices include a first stage cutting blade and a second stage "batter" that essentially bashes the cuttings of the cutting blade into smaller particles. However, it has been found that providing a second stage blade with shear cutting action reduces the time required to obtain a smaller average mulch particle size. Further, many of these prior art devices direct their resulting lawn cuttings through an exhaust port located on either side of the device. As such, these types of devices tend to cause the mulch to collect in large, visually discernible piles.

Generally with such prior art devices, if one desires to have a very finely cut mulch one must slow the speed at which the device progresses over a given area of the lawn. Alternatively, if a coarser cut is desired, such as is acceptable for some coarse grass types, such devices may be pushed over the lawn relatively quickly. Therefore, adjusting the speed at which such devices travels over the lawn is proportional to the average particle size of the resulting mulch. This is true because, generally speaking, lawn cuttings travel through such devices once and are expelled; they have a greater chance of being picked-up again and subsequently cut to a smaller size if the mower is still in the area. Regulating the resulting size of the mulch in this manner is difficult at best. Users of such devices must frequently change the speed at which they are moving these types of mowers over the ground, such as at the edge of the lawn, when turning, when stopping for a moment to remove rocks or other objects from the mowing path, and the like. As a result, these types of prior art mowers often result in a non-uniform distribution of mulch and mulch size.

Clearly, then, there is a need for a mulching type mowing apparatus that distributes cuttings in a completely uniform, symmetric distribution. Such a needed device would also be more effective at pulverizing the lawn cuttings, and would provide a means for adjusting the average mulch particle size. The present invention fulfills these needs and provides further related advantages.

SUMMARY OF THE INVENTION

The present invention is an apparatus for mowing and shredding a lawn or other garden debris. A motor is mounted on a top cover having a horizontal top surface. A push handle is engaged with the top cover and extends upwardly at an angle for pushing the apparatus in a forward rolling motion on the ground. The top cover is attached to and above a perforated partition that is supported by an undercarriage that includes a plurality of wheels. The motor has a downwardly extending drive shaft that extends through the top cover to engage a shredder blade that is positioned between the top cover and the perforated partition. The drive shaft further extends downwardly through a central exhaust hole of the partition to a mower blade that is positioned between the partition and the ground. The blades, when rotating, cause an upward air flow that sucks lawn debris into first the mower blade, and then through openings in the perforated partition, and into the shredder blade. The subsequent pulverized lawn debris is then ejected through discharge slots located around the peripheral edge of the top cover.

The present invention is a mulching type mowing apparatus that distributes cuttings in a completely uniform, symmetric distribution. The present device is more effective at pulverizing the lawn cuttings than devices found in the prior art, and further provides a means for adjusting the average mulch particle size. Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENT

Figure 1:
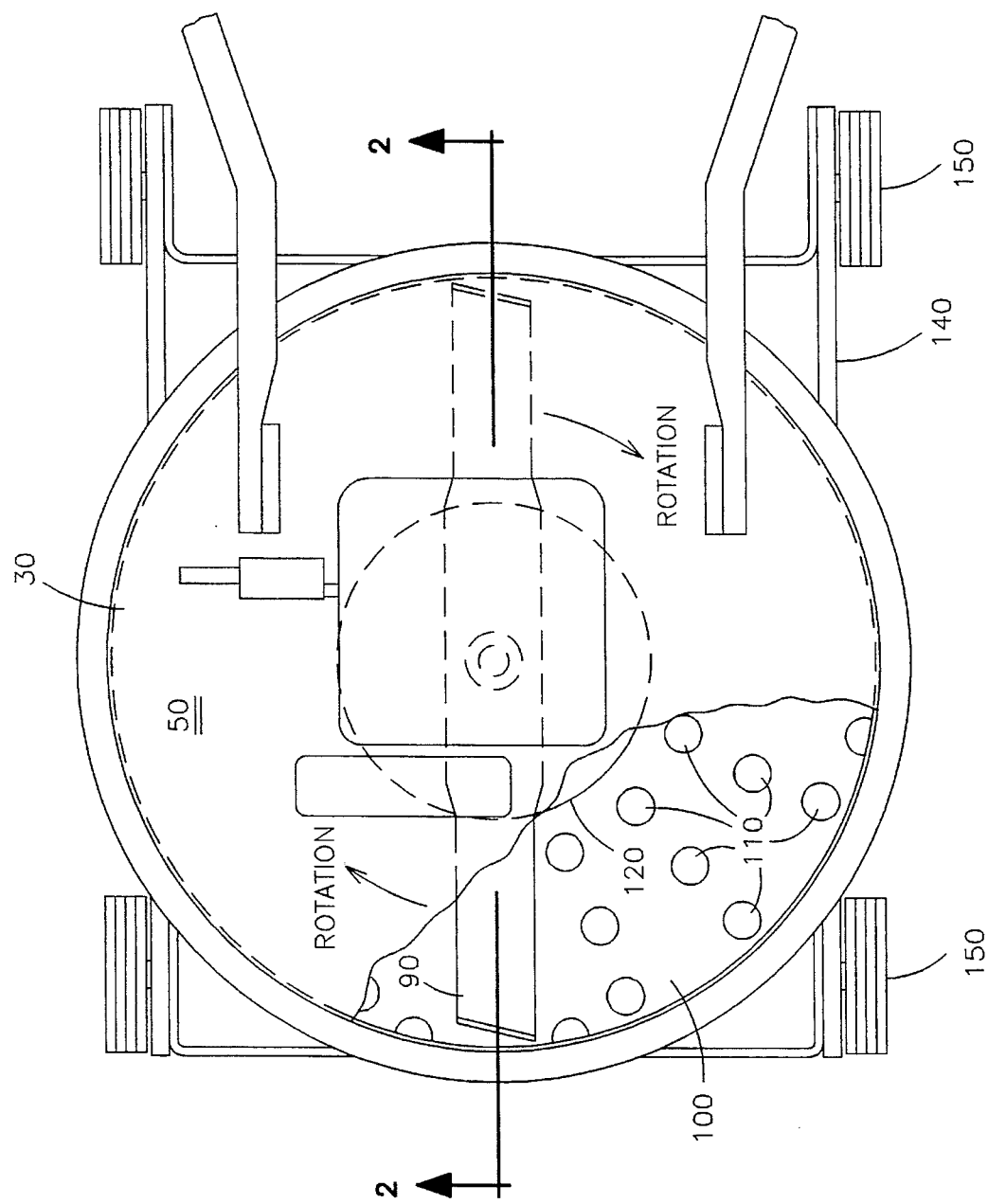
FIG. 1 is a top plan view of an apparatus for lawn mowing and shredding, partially cut away, showing a top cover and a perforated partition enclosed therein.
Figure 2:
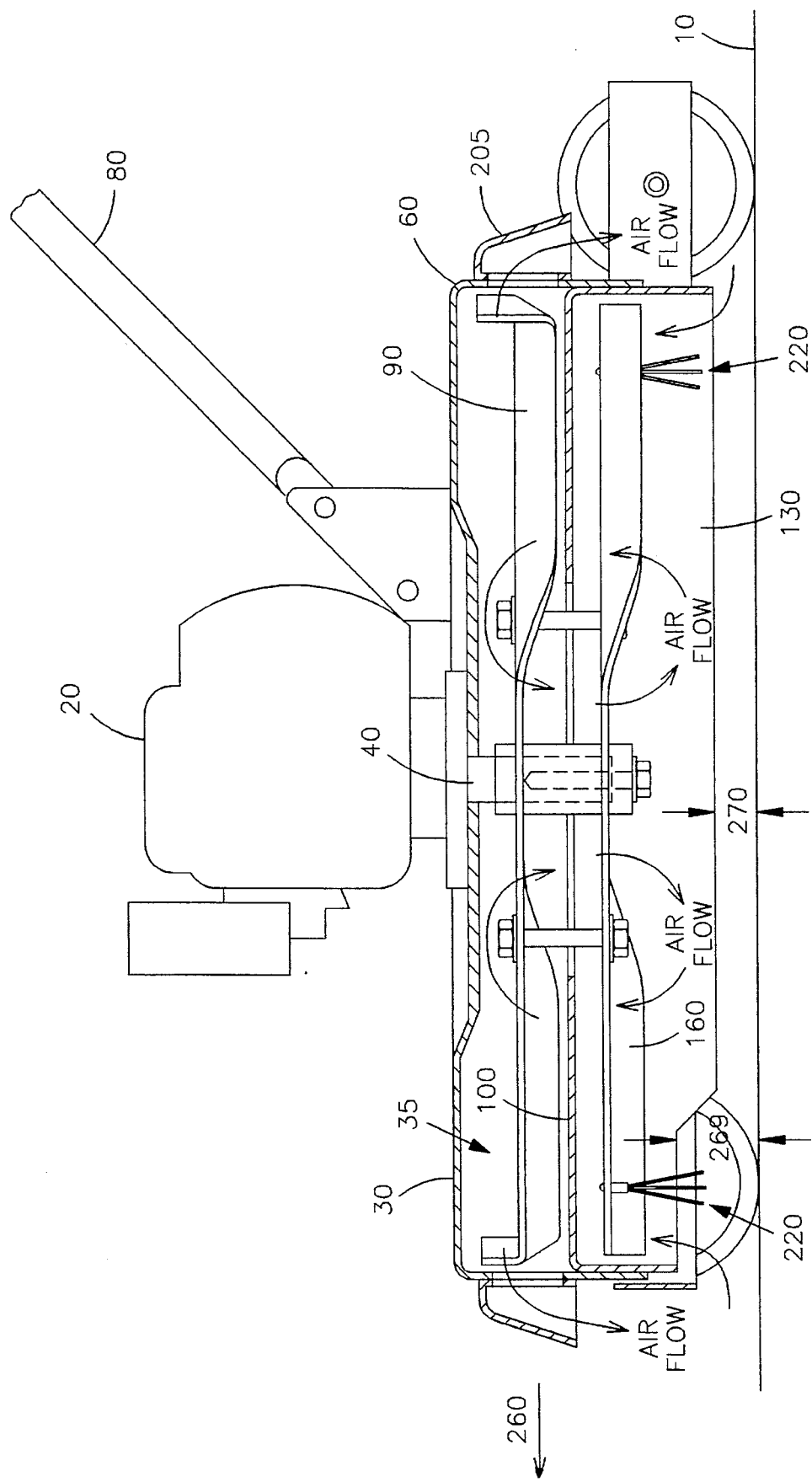
FIG. 2 is a cross-sectional view of the invention, taken generally along lines 2—2 of FIG. 1, showing a shredder blade and a mower blade separated by the partition in an internal cover space.
Figure 3:
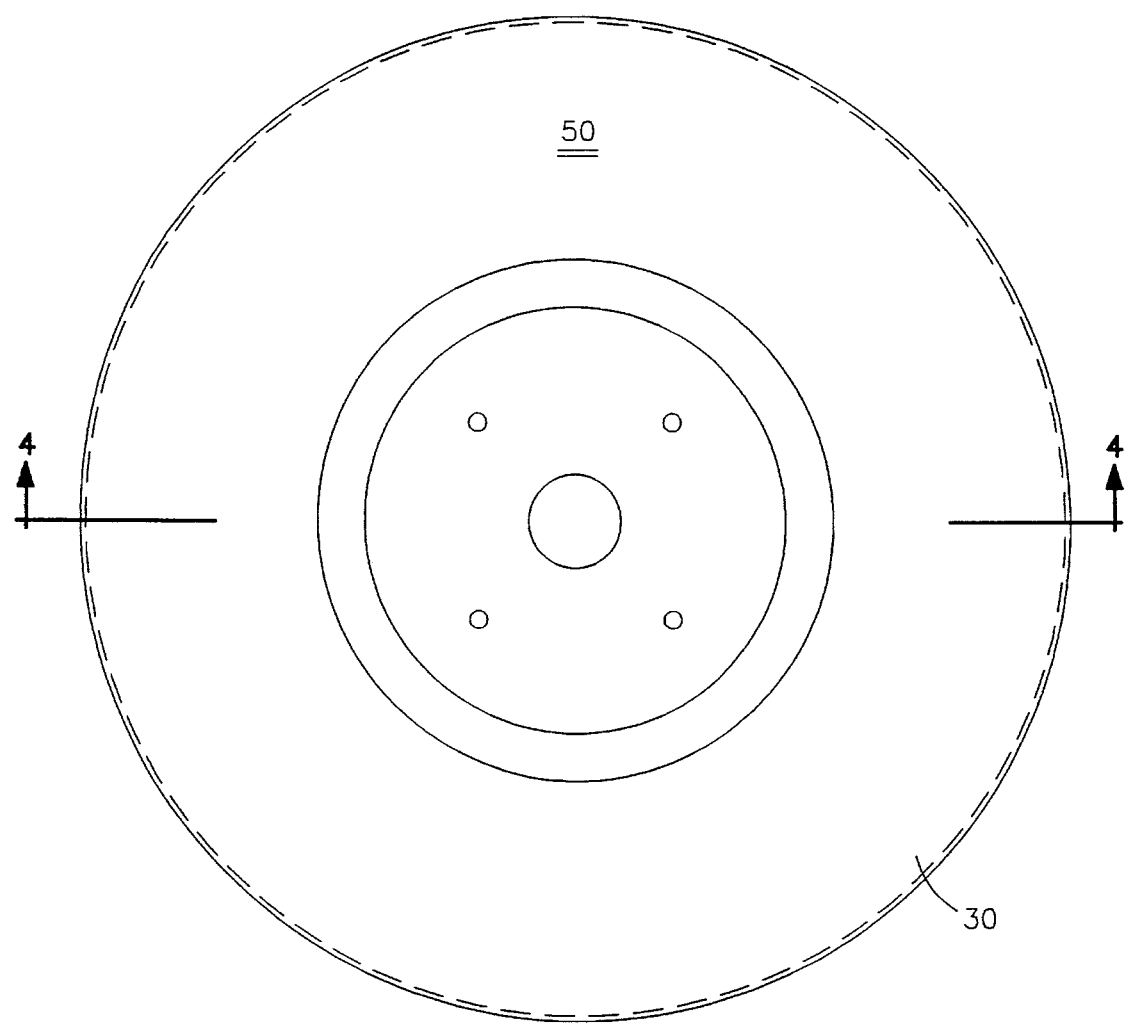
FIG. 3 is a top plan view of the top cover of the invention.
Figure 4:
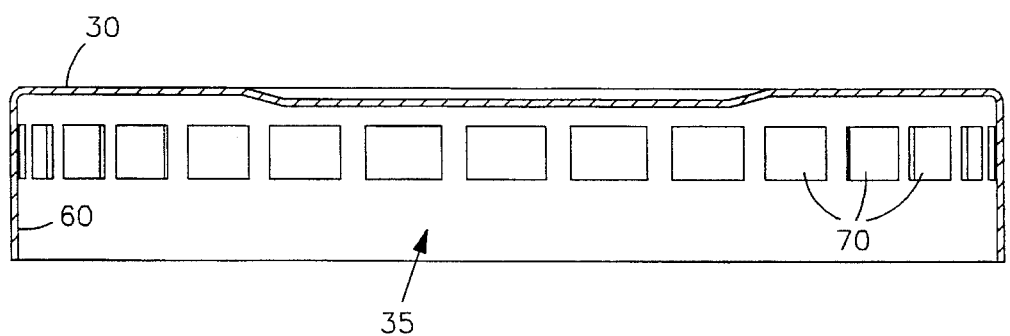
FIG. 4 is a cross-sectional view of the invention, taken generally along lines 4—4 of FIG. 3, showing first discharge slots of the top cover.

FIGS. 1 and 2 show a mobile apparatus that moves on a ground surface 10 for mowing a lawn and shredding cut grass clippings, leaves, and other lawn debris into powder. A motor 20 is integrally mounted on a top cover 30. A drive shaft 40 of the motor 20 extends vertically downward through the top cover 30. The top cover 30 has a generally horizontal top surface 50 (FIG. 3) that is integrally formed with a downwardly extending peripheral rim 60 (FIG. 4), together defining an interior cover space 35 (FIG. 2). The rim 60 provides a series of upright first discharge slots 70.

Figure 6A:
FIG. 6A is a side elevational view of the shredder blade, showing a pair of upwardly extending blade tips.

A push handle 80 is engaged with the top cover 30 and extends upwardly at an angle therefrom for pushing the apparatus in a forward rolling motion on the ground surface 10. A linear shredder blade 90 (FIG. 6A) is medially engaged with the drive shaft 40 for rotation therewith, driven by the motor 20. Preferably, the shredder blade 90 further includes a pair of upwardly extending blade tips 280, each of the tips 280 being positioned at one of the free ends of the shredder blade 90 (FIG. 6A). Such tips 280 may be set at an angle 290 so as to drive air outwardly from the cover 30 through the discharge slots 70. Further, such tips 280 may be spaced apart from the discharge slots 70 by a degree to enable shearing action between the tips 280 and the discharge slots 70. The shredder blade 90 is made from a rigid metal material able to take and keep a keen edge, such as steel.

Figure 7:
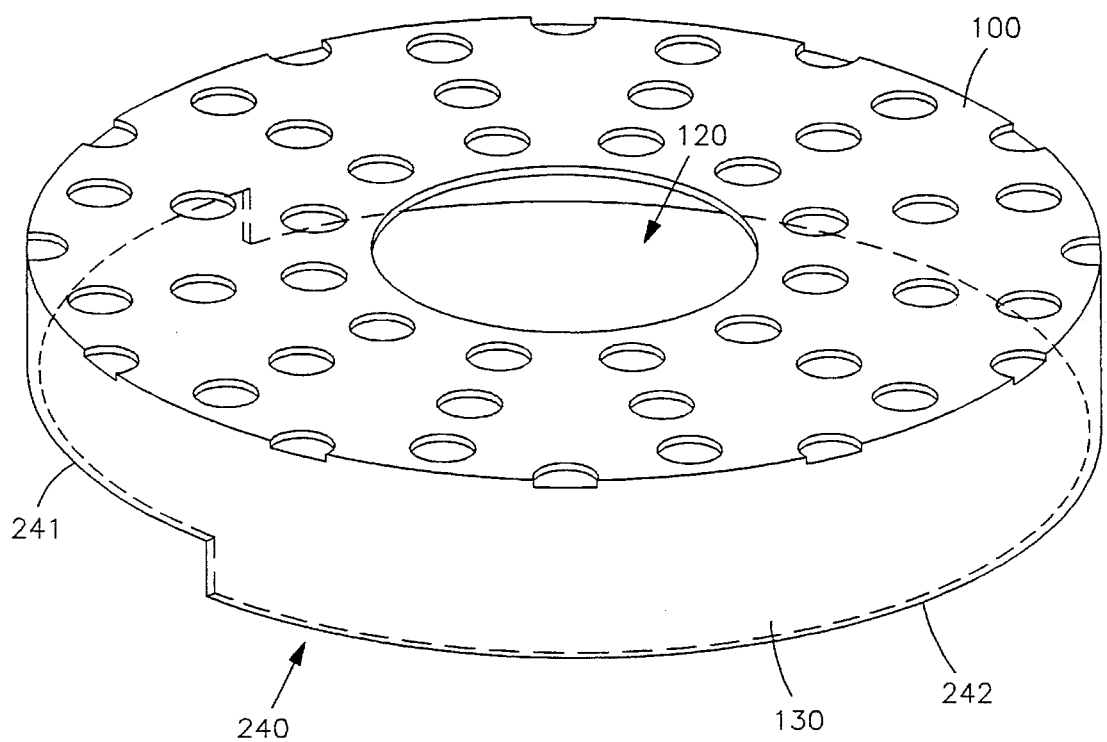
FIG. 7 is a perspective view of the partition, showing openings therein and a downwardly extending skirt thereof.

A rigid, metallic partition 100 has a plurality of spaced apart openings 110 therein and is positioned below the shredder blade 90 in generally parallel alignment with the horizontal top surface 50. The partition 100 encloses the interior cover space 35 but for a central exhaust hole 120 (FIG. 7) in the partition 100. The partition 100 has an integral, peripheral, downwardly extending skirt 130 supported for rolling on the ground surface 10 by an undercarriage 140. The undercarriage 140 includes a plurality of wheels 150 rotationally secured thereto for rolling support of the skirt 130, the cover 30, and the motor 20. The openings 110 are round holes arranged in radial orientation, preferably as four concentric circular rows (FIG. 7).

Figure 8:
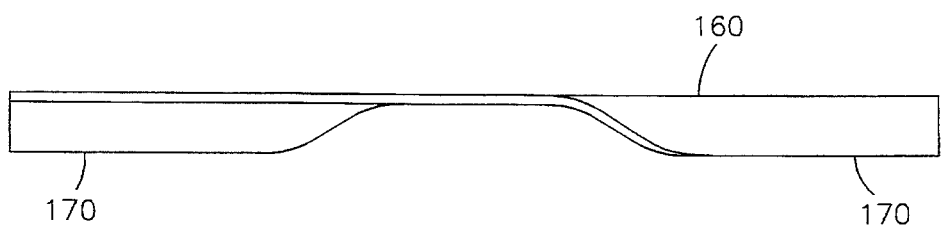
FIG. 8 is a side elevational view of the mower blade.

A linear mower blade 160 (FIG. 8) is engaged medially with the drive shaft 40 at a position below the perforated partition 100 such that the partition 100 separates the blades 90,160 (FIG. 2). The mower blade 160 is of such a shape as to cause a suction force that causes air to move upward into the partition 100 from the ground surface 10 when the blade 160 is rotating.

Figure 9:
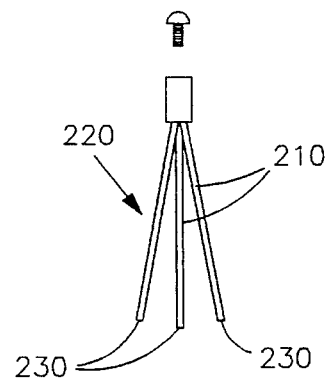
FIG. 9 is a partial side elevational view of a bundle of flexible cutting tines.

Preferably, the invention further includes a plurality of cutting tines 210 of a flexible elongate material (FIGS. 2 and 9). The tines 210 are positioned side-by-side and held as a bundle 220 on the mower blade 160 and together extend downwardly therefrom. Each of the tines 210 terminates in an independent free end 230. The tines 210 serve to cut undesirable crawling type grass, such as crab grass, while not affecting free standing grass blades.

Figure 6B:
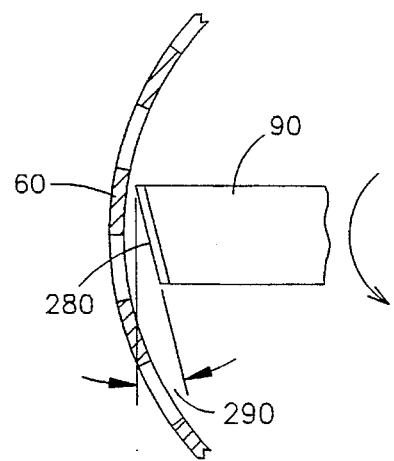
FIG. 6B is a partial top plan view of the invention, partially showing the shredder blade and the top cover.

The shredder blade 90 has a pair of horizontally disposed cutting edges 170 spaced apart from the partition 100 by a degree such as to enable shearing action between the cutting edges 170 and the openings 110 of the partition 100 (FIG. 6B). As a result, material that moves through the openings 110 is effectively shredded by blade 90.

Figure 5:
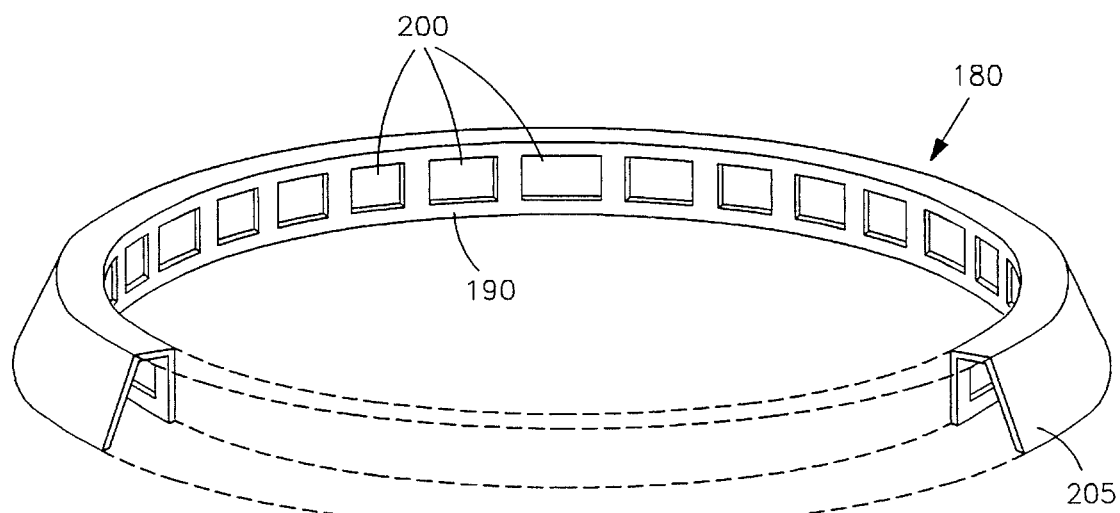
FIG. 5 is a perspective illustration of a circular slot adjustment ring of the invention showing a series of second discharge slots and a deflection skirt thereof.

A circular slot adjustment ring 180 has a vertical wall 190 providing a series of second discharge slots 200 therethrough (FIG. 5). The slot adjustment ring 180 further includes a deflection skirt 205 annularly positioned and extending radially outwardly and downwardly from the vertical wall 190. The wall 190 is fitted for annular circular exterior contact with the peripheral rim 60 of the top cover 30 and slidably affixed thereto, such as by close friction fit, or other commonly known slidable engagement means. As such, the relative positions of the series of first and second discharge slots 70,200 adjust the conductance of air flow exiting the apparatus. The relative positions of the series of first and second discharge slots 70,200 are adjusted by rotating the adjustment ring 180 with respect to the top cover 30. When the series of first and second discharge slots 70,200 are completely aligned, cuttings from the blades 90,160 have a greater chance of leaving the interior cover space 35 and therefore result in a larger average particle size. The deflection skirt 205 serves to force the air flow in a downwardly direction towards the ground surface 10, to act as a guard to prevent placing a finger into the discharge slots 70,200, and to keep debris from flying away from the apparatus. When the series of first and second discharge slots 70,200 are not aligned, cuttings from the blades 90,160 have a reduced opportunity of leaving the interior cover space 35 and therefore will tend to remain in the interior cover space 35 for a longer duration, all the while being more finely cut into smaller particle sizes.

The skirt 130 of the partition 100 includes a downwardly facing continuous peripheral edge 240 (FIG. 7). A portion 241 of the edge 240 faces in a direction 260 of forward motion of the apparatus and defines clearance 269 with respect to the ground surface 10 to permit the apparatus to have sufficient clearance for moving over ground debris. The remainder 242 of the edge 240 is set at reduced clearance 270 thereto for safety and improved cutting effectiveness.

In operation, the lawn debris is sucked upwardly into the cover 30, causing the interior space 35 within the cover 30 to become pressurized. A portion of the air is ejected through the discharge slots 70,200, and the remainder of the air is forced to move radially inwardly and then downwardly through the central exhaust hole 120 to the ground surface 10, where it then moves radially outwardly and then is sucked upwardly back into the interior space within the top cover 30 to be cut or shredded again. With the discharge slots 70,200 aligned for maximum air flow the apparatus can cut and discharge debris faster. Also, wet grass is more effectively discharged through the fully open slots 70,200. With slots 70,200 aligned for restricted air flow, the apparatus produces a smaller particle size due to a longer dwell time within the apparatus. With the blade tips 280 set at an angle with respect to the cover rim 60, as shown in FIG. 6B, the passing blade tip 280 produces an elevated pressure against the cover rim 60, thereby forcing debris to move through slots 70,200.

While the invention has been described with reference to a preferred embodiment, it is to be clearly understood by those skilled in the art that the invention is not limited thereto. Rather, the scope of the invention is to be interpreted only in conjunction with the appended claims.

What is claimed is:

1. A mobile apparatus for mowing a lawn and shredding cut grass clippings, leaves and other lawn debris into a powder, while moving on a ground surface comprising:

a motor integrally mounted on a top cover with a drive shaft of the motor extending vertically downwardly through the top cover, the top cover having a generally horizontal top surface, integrally formed with a downwardly extending peripheral rim, the top cover and rim defining an interior cover space, the rim providing a series of upright first discharge slots, a push handle engaged with the top cover and extending upwardly at an angle therefrom for pushing the apparatus in a forward rolling motion on the ground surface, a linear shredder blade, the blade medially engaged with the drive shaft for rotation therewith driven by the motor, a partition having a plurality of spaced apart openings therein, the partition positioned below the shredder blade, in generally parallel alignment with the horizontal top surface, enclosing the cover save a central exhaust hole, the partition having an integral, peripheral, first downwardly extending skirt supported, for rolling on the ground surface, by an undercarriage including a plurality of wheels rotationally secured to the skirt in rolling support thereof;

a linear mower blade engaged medially with the drive shaft at a position below the perforated partition such that the partition separates the blades, the mower blade being of such shape as, in rotating, to generate a suction forcing air to move upward into the partition;

the shredder blade having a pair of horizontally disposed cutting edges spaced apart from the partition by a degree to enable shearing action between the cutting edges and the perforations of the partition;

a circular slot adjustment ring having a vertical wall providing a series of second discharge slots therethrough and a deflection skirt annularly positioned and extending radially outwardly and downwardly from the vertical wall, said wall fitted for annular circular exterior contact with the peripheral rim of the top cover and slidably affixed thereto such that the relative positions of the series of first and second discharge slots adjust conductance of air flow exiting the apparatus, the deflection skirt forcing said air flow downwardly;

whereby the lawn debris is sucked upwardly into the interior cover space, the interior cover space being pressurized thereby, a portion of the air being ejected through the discharge slots, the remainder of the air being forced to move radially inwardly and then downwardly through the central exhaust hole to the ground surface to move radially outwardly and then upwardly into the interior cover space.

2. The apparatus of claim 1 further including a plurality of cutting tines of a flexible elongate material, the tines positioned side-by-side and held as a bundle on the mower blade and together extending downwardly therefrom, each of the tines terminating in an independent free end.

3. The apparatus of claim 1 wherein the openings in the partition are round holes arranged in radial orientation.

4. The apparatus of claim 3 wherein the holes are arranged in four concentric circular rows.

5. The apparatus of claim 1 wherein the first downwardly extending skirt includes a downwardly facing continuous peripheral edge, a portion of the edge facing in a direction of forward motion of the apparatus and defining clearance with respect to the ground surface, the remainder of the edge being set at reduced clearance thereto.

6. The apparatus of claim 1 wherein the shredder blade includes a pair of upwardly extending blade tips, each of the tips positioned at one of the free ends of the shredder blade.

7. The apparatus of claim 6 wherein the tips are set at an angle so as to drive air outwardly from the cover through the discharge slots.

8. The apparatus of claim 6 wherein the tips are spaced apart from the discharge slots by a degree to enable shearing action between the tips and the discharge slots.

* * * * *